O. A. SMITH.
TOOL HOLDER OR BRACKET.
APPLICATION FILED AUG. 27, 1910.
1,008,677.
Patented Nov. 14, 1911.
2 SHEETS—SHEET 1.
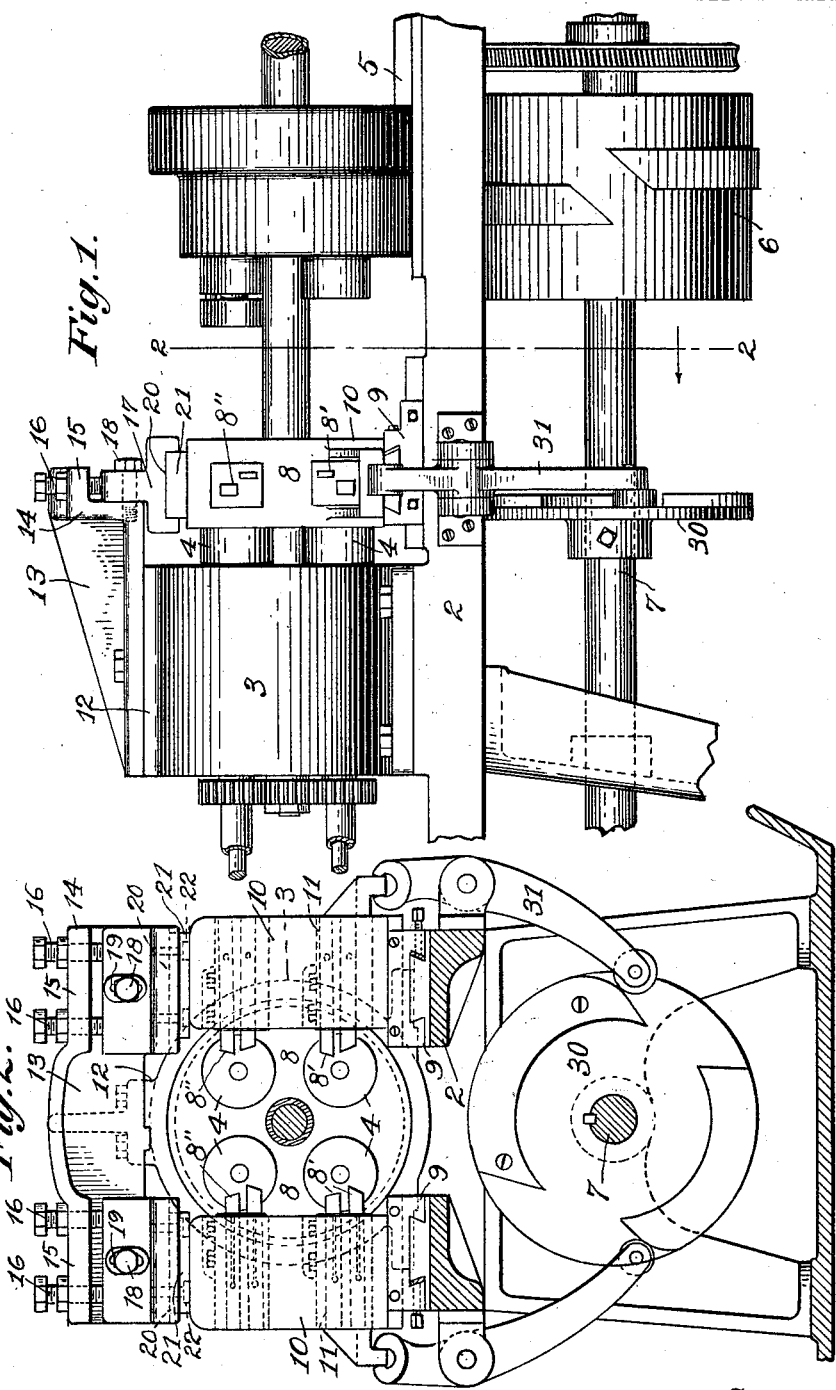

O. A. SMITH.
TOOL HOLDER OR BRACKET.
APPLICATION FILED AUG. 27, 1910.
1,008,677.
Patented Nov. 14, 1911.
2 SHEETS—SHEET 2.
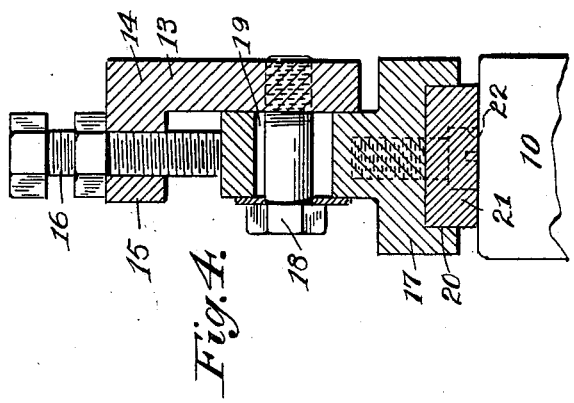
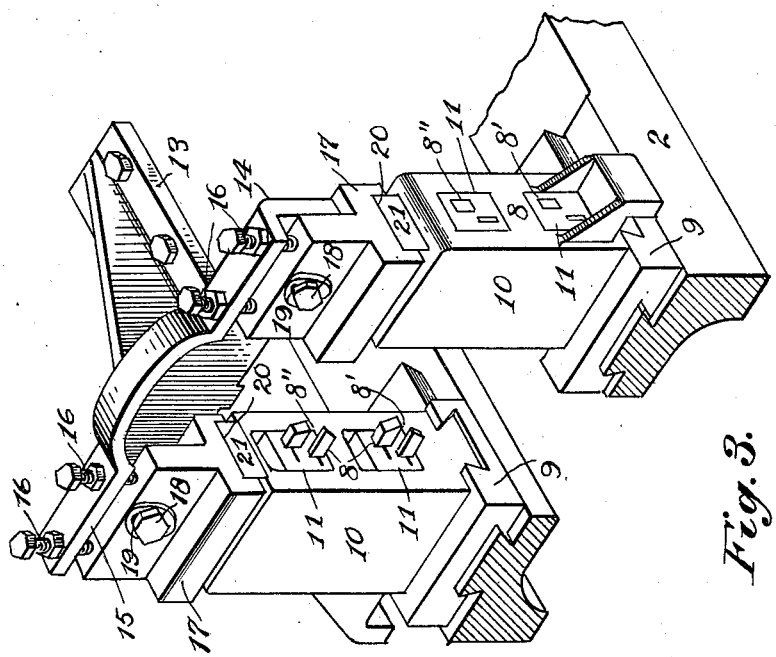

UNITED STATES PATENT OFFICE.

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

TOOL HOLDER OR BRACKET.

1,008,677.  Specification of Letters Patent.  Patented Nov. 14, 1911.

Application filed August 27, 1910. Serial No. 579,239.

*To all whom it may concern:*

Be it known that I, OSCAR A. SMITH, a citizen of the United States, residing at Cleveland, in the county of Cuyahoga and State of Ohio, have invented certain new and useful Improvements in Tool Holders or Brackets, of which the following is a specification.

This invention relates to metal working machines, more particularly to means for rigidly holding the forming and cut off tool slides in position, the object of the invention being to provide an improved tool slide bracket or shoe constructed to permit the use of superimposed tool slides, by means of which the output of the machine is materially increased, by reason of the fact that the tool slides are prevented from crowding sidewise, and the chattering, vibration and ducking of the tools likewise prevented. It is now well understood that it is not the forming or cutting action of such class of tools that causes them to become dull, but the vibration or chattering thereof, and to prevent this and thereby obtain increased cutting efficiency of the tool and therefore greater output of work is the primary object of the present improvement, and especially so in connection with superimposed tiers of forming and cutting off tools or tool slides.

In the drawings accompanying and forming part of this specification, Figure 1 illustrates this improvement as applied to a multiple spindle screw machine, part of which only is illustrated in the drawings; Fig. 2 is a cross sectional view partly in elevation taken in line 2—2 Fig. 1; Fig. 3 is a perspective detail view illustrating the improvement detached from the machine and applied to superimposed tiers of forming and cut off tools, and Fig. 4 is a detail sectional view of this improved shoe or bracket.

The present improvement is shown in connection with a multiple spindle screw machine comprising a bed 2, supporting a turret casing 3, the turret of which carries a plurality of work carrying spindles 4 driven in the usual manner. Mounted on the bed is the usual tool carrying slide 5, the turret usually being operated from a cam shaft 7, and the tool slide being operated by a cam drum 6 mounted on the cam shaft 7, which may be driven in any suitable manner.

The forming and cut off tools 8 are shown in the present instance as comprising two sets located at opposite sides of the work spindles, each set of tools comprising a plurality of superimposed tools or sets of tools 8' and 8''. Each set of tools 8 is mounted upon a dovetail slide 9 whereby they may be adjusted in the axial plane of the work spindles. Carried by this slide 9 is a tool slide head or support 10 mounted on a dovetail slideway of the slide 9, whereby it may be adjusted or shifted transversely of the work spindles to carry the tools toward and from the work. Carried by each tool head slide or support 10 are the tool holders or carriers 11, which are shown located in superimposed tiers. For preventing the vibration, chattering and ducking of the tools there is secured to the turret casing 12 this improved bracket or shoe 13, this being bolted to the top of the turret casing, and is provided at its forward end with a crosswise extending member or bracket 14, having a flange 15 for the reception of adjusting and clamping screws 16.

Mounted on top of each of the tool slides 10 is the shoe proper 17 comprising an inverted T shaped member clamped to the crosswise extending member 14 by a clamping bolt 18, which projects through an enlarged opening 19 of the shoe 17, and thus permits it to be firmly adjusted into engagement with its tool slide 10 through the medium of adjusting screws 16. Each of these shoes 19 is provided with a recess 20 on its under side for the reception of a slide engaging member 21 preferably of bronze metal bolted to the shoe 17 by a bolt 22.

By means of this improved shoe or bracket it will be observed that the tool slides 10 are firmly held against vibration, by reason of the additional support at the top thereof, while the sliding movement thereof toward and from the work is not interfered with. This to and fro movement is imparted to the tool slides 10 in the usual manner by means of a cam 30 fixed to the cam shaft 7, and the rocking arms 31 pivoted to the bed of the machine.

From the foregoing it will be observed that the shoes 17 are adjustable, so that they can always be in firm engagement with the top surfaces of the tool slides 10. It has been found in practice that a machine cutting four pieces at one time with two tools in each slide that without this tool slide bracket the output was about four thousand per day on a half inch cut, and that under exactly the same conditions this same machine having this improved bracket, the output was increased to about eight thousand per day. It will be observed also that the position of the bracket and its shoes is such that it does not interfere in any way with the adjustment of the tool slides or the tools to meet the various requirements. The present improvement is also well adapted for use with machines where extremely heavy cuts are made, even though such tools are not located in superimposed tiers, and obviously may be used with one or more sets of tools located either in superimposed tiers or otherwise. In the present improvement it is shown as a duplex formed shoe, especially well adapted for use with multiple spindle screw machines where it is frequently necessary to form on the work of the two top spindles and cut off the work on the two bottom spindles, which, of course, requires the use of a double tool cut off slide.

I claim as my invention:

1. In a metal working machine the combination of a work support, a tool carrier slide movable transversely toward and from the work and carrying a tool holder, means for supporting the slide at its underside, and means for firmly engaging the top of said slide thereby to prevent the chattering and vibration of the tool carried by the holder, said supporting and engaging means being carried by separate means whereby one is supported independently of the other.

2. In a metal working machine the combination of a work support, a tool carrier slide movable transversely toward and from the work and carrying a tool holder, means for supporting the slide at its underside, and adjustable means for firmly engaging the top of said slide thereby to prevent the chattering and vibration of the tool carried by the holder, said supporting and engaging means being carried by separate means whereby one is supported independently of the other.

3. In a metal working machine the combination of a work support, a tool carrier slide movable transversely toward and from the work and carrying superimposed tool holders, means for supporting the slide at its underside, and means for firmly engaging the top of said slide thereby to prevent the chattering and vibration of the tools carried by the holders, said supporting and engaging means being carried by separate means whereby one is supported independently of the other.

4. In a metal working machine the combination of a work support, a tool carrier slide movable transversely toward and from the work and carrying superimposed tool holders, means for supporting the slide at its underside, and adjustable means for firmly engaging the top of said slide thereby to prevent the chattering and vibration of the tools carried by the holders, said supporting and engaging means being carried by separate means whereby one is supported independently of the other.

5. In a metal working machine the combination of a work support, a tool carrier slide movable transversely toward and from the work and carrying a tool holder, means for supporting it at its lower side, and means for firmly engaging the top of said slide thereby to prevent the chattering and vibration of the tool carried by the holder, and comprising a rigidly secured bracket, and a shoe carried by said bracket, said supporting and engaging means being carried by separate means whereby one is supported independently of the other.

6. In a metal working machine the combination of a work support, a tool carrier slide movable transversely toward and from the work and carrying a tool holder, means for supporting it at its lower side, and means for firmly engaging the top of said slide thereby to prevent the chattering and vibration of the tool carried by the holder, and comprising a rigidly secured bracket, and an adjustable shoe carried by said bracket, said supporting and engaging means being carried by separate means whereby one is supported independently of the other.

7. In a metal working machine the combination of a work support, a tool carrier slide movable transversely toward and from the work and carrying a tool holder, means for supporting it at its lower side, and means for firmly engaging the top of said slide thereby to prevent the chattering and vibration of the tool carried by the holder, and comprising a rigidly secured bracket, and an adjustable shoe carried by said bracket, comprising a recessed member having a slide engaging member secured in said recess.

8. In a metal working machine the combination of a work support, a tool carrier slide movable transversely toward and from the work and carrying a tool holder, means for supporting it at its lower side, and means for firmly engaging the top of said slide thereby to prevent the chattering and vibration of the tool carried by the holder, and comprising a rigidly secured bracket and an adjustable shoe clamped transversely to said bracket, and comprising a recessed, inverted T shaped member having a slide engaging member secured in said recess.

9. In a metal working machine the combination of a work support, a pair of opposed tool carrier slides movable transversely toward and from the work, and each carrying a tool holder, means for supporting the slides at their lower sides, and means extending from one to the other for firmly engaging the top surfaces of said slides thereby to prevent the chattering and vibration of the tools carried by the holders, said supporting and engaging means being carried by separate means whereby one is supported independently of the other.

10. In a metal working machine the combination of a work support, a pair of opposed tool carrier slides movable transversely toward and from the work, and each carrying superimposed tool holders, means for supporting the slides at their underside, and means extending from one to the other for firmly engaging the upper surfaces of said slides thereby to prevent the chattering and vibration of the tools carried by the holders, said supporting and engaging means being carried by separate means whereby one is supported independently of the other.

11. In a metal working machine the combination of a work support, a pair of opposed tool carrier slides movable transversely toward and from the work, and each carrying superimposed tool holders, means for supporting the slides at their underside, and means extending from one to the other for firmly engaging the upper surfaces of said slides thereby to prevent the chattering and vibration of the tools carried by the holders, and comprising a rigidly supported bracket having lateral extensions, and a shoe adjustably clamped to each of said extensions one engaging each slide.

12. In a metal working machine the combination of a work support, a pair of opposed tool carrier slides movable transversely toward and from the work, and each carrying superimposed tool holders, means for supporting the slides at their underside, and means extending from one to the other for firmly engaging the upper surfaces of said slides thereby to prevent the chattering and vibration of the tools carried by the holders, and comprising a rigidly supported bracket having lateral extensions, and a shoe adjustably clamped to each of said extensions, each of said shoes having a recess and a slide engaging member secured in said recess.

13. In a metal working machine the combination of a work support, a pair of opposed tool carrier slides movable transversely toward and from the work, and each carrying superimposed tool holders, means for supporting the slides at their underside, and means extending from one to the other for firmly engaging the upper surfaces of said slides thereby to prevent the chattering and vibration of the tools carried by the holders, and comprising a rigidly supported bracket having lateral extensions, a shoe clamped transversely to each of said extensions and one engaging each slide, and adjusting clamping means carried by each of said extensions for engaging the top of the shoe.

14. In a multiple spindle screw machine the combination with a bed and a turret casing supported thereby carrying work spindles, of a pair of opposed tool carrier slides adjustably supported on said bed and movable transversely toward and from the work spindles, each carrying a plurality of superimposed tool holders, a bracket clamped to said turret casing and extending from one slide to the other, and having lateral extensions and a shoe clamped to each of said extensions in position to firmly engage the upper surface of one of said slides thereby to prevent the chattering and vibration of the tools carried by the holders.

15. In a multiple spindle screw machine the combination with a bed and a turret casing supported thereby carrying work spindles, of a pair of opposed tool carrier slides adjustably supported on said bed and movable transversely toward and from the work spindles, each carrying a plurality of superimposed tool holders, a bracket secured to said turret casing and extending from one slide to the other, and having flanged lateral extensions, a shoe clamped transversely to each of said extensions in position to engage the upper surface of the tool carrier slide, and means carried by the flange of each extension for adjusting and clamping the shoe in firm engagement with its slide thereby to prevent the chattering and vibration of the tool carried by the holder.

16. In a multiple spindle screw machine the combination with a bed and a turret casing supported thereby carrying work spindles, of a pair of opposed tool carrier slides adjustably supported on said bed and movable transversely toward and from the work spindles, each carrying a plurality of superimposed tool holders, a bracket secured to said turret casing and extending from one slide to the other, and having flanged lateral extensions, a shoe clamped transversely to each of said extensions in position to engage the upper surface of the tool carrier slide, and means carried by the flange of each extension for adjusting and clamping the shoe in firm engagement with its slide thereby to prevent the chattering and vibration of the tool carried by the holder, each of said shoes carrying a removable slide engaging member.

OSCAR A. SMITH.

Witnesses:
I. G. LOE,
W. S. CHASE.

Copies of this patent may be obtained for five cents each, by addressing the "Commissioner of Patents, Washington, D. C."